United States Patent
Diab et al.

(10) Patent No.: US 8,276,013 B2
(45) Date of Patent: Sep. 25, 2012

(54) SYSTEM AND METHOD FOR REDUCING A LINK FAILURE DETECTION DELAY USING A LINK ENERGY SIGNAL WHILE IN A LOW POWER IDLE MODE

(75) Inventors: Wael William Diab, San Francisco, CA (US); Scott Powell, Carlsbad, CA (US)

(73) Assignee: Broadcom Corporation, Irvine, CA (US)

( * ) Notice: Subject to any disclaimer, the term of this patent is extended or adjusted under 35 U.S.C. 154(b) by 683 days.

(21) Appl. No.: 12/342,462

(22) Filed: Dec. 23, 2008

(65) Prior Publication Data

US 2009/0204836 A1    Aug. 13, 2009

Related U.S. Application Data

(60) Provisional application No. 61/028,368, filed on Feb. 13, 2008.

(51) Int. Cl.
*G06F 1/00* (2006.01)
(52) U.S. Cl. ......................................... 713/323
(58) Field of Classification Search ........... 713/300, 713/320
See application file for complete search history.

(56) References Cited

U.S. PATENT DOCUMENTS

| | | | | |
|---|---|---|---|---|
| 3,804,974 A * | 4/1974 | Tanaka | ............ | 386/274 |
| 6,145,024 A * | 11/2000 | Maezawa et al. | ............ | 710/14 |
| 2004/0153701 A1* | 8/2004 | Pickell | ............ | 714/4 |
| 2005/0078600 A1* | 4/2005 | Rusmisel et al. | ............ | 370/217 |
| 2005/0249123 A1* | 11/2005 | Finn | ............ | 370/242 |
| 2005/0270870 A1* | 12/2005 | Shin et al. | ............ | 365/202 |
| 2005/0285626 A1* | 12/2005 | Lin | ............ | 326/93 |
| 2007/0113110 A1* | 5/2007 | Mizutani | ............ | 713/300 |
| 2007/0133315 A1* | 6/2007 | Kang et al. | ............ | 365/189.05 |
| 2008/0225841 A1* | 9/2008 | Conway et al. | ............ | 370/389 |
| 2009/0052317 A1* | 2/2009 | Takagi et al. | ............ | 370/223 |
| 2010/0095167 A1* | 4/2010 | Kotrla et al. | ............ | 714/705 |

* cited by examiner

*Primary Examiner* — Mohammed Rehman
(74) *Attorney, Agent, or Firm* — Duane S. Kobayashi

(57) ABSTRACT

A system and method for using a link energy signal in physical layer devices (PHYs) having a silent channel/interface in energy efficient Ethernet (EEE). LPI modes in EEE suffer deficiencies in cable unplug detection due to the latency in refresh cycles. LPI modes in EEE also suffer from potential frequency drift, which leads to high bit error rate (BER) when coming out of LPI mode. A link energy signal transmitted during LPI modes enables real-time detection of cable unplug and the frequency lock to be maintained.

22 Claims, 5 Drawing Sheets

SYSTEM AND METHOD FOR REDUCING A LINK FAILURE DETECTION DELAY USING A LINK ENERGY SIGNAL WHILE IN A LOW POWER IDLE MODE

This application claims priority to provisional application No. 61/028,368, filed Feb. 13, 2008.

BACKGROUND

1. Field of the Invention

The present invention relates generally to Ethernet systems and, more particularly, to a system and method for using a link energy/sync pulse in physical layer devices (PHYs) having a silent channel/interface in energy efficient Ethernet (EEE).

2. Introduction

Energy costs continue to escalate in a trend that has accelerated in recent years. Such being the case, various industries have become increasingly sensitive to the impact of those rising costs. One area that has drawn increasing scrutiny is the IT infrastructure. Many companies are now looking at their IT systems' power usage to determine whether the energy costs can be reduced. For this reason, an industry focus on energy efficient networks has arisen to address the rising costs of IT equipment usage as a whole (i.e., PCs, displays, printers, servers, network equipment, etc.).

In designing an energy efficient solution, one of the considerations is the traffic profile on the network link. For example, many network links are typically in an idle state between sporadic bursts of data, while in other network links, there can be regular or intermittent low-bandwidth traffic, with bursts of high-bandwidth traffic. An additional consideration for an energy efficient solution is the extent to which the traffic is sensitive to buffering and latency. For example, some traffic patterns (e.g., HPC cluster or high-end 24-hr data center) are very sensitive to latency such that buffering would be problematic. For these and other reasons, applying energy efficient concepts to different traffic profiles would lead to different solutions. These varied solutions can therefore seek to adapt the link, link rate, and layers above the link to an optimal solution based on various energy costs and impact on traffic, which itself is dependent on the application.

One example of an EEE solution is a low power idle (LPI) mode. In general, LPI relies on turning the active channel silent when there is nothing to transmit. When data is transmitted, it is transmitted at full PHY capacity. Energy is thereby saved when the link is off. While this low power idle mode can save the most power, what is needed is a mechanism that ensures that a cable unplug can be detected remotely in a timely manner and that a frequency lock is maintained.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

SUMMARY

A system and method for using a link energy signal in physical layer devices (PHYs) having a silent channel/interface in energy efficient Ethernet, substantially as shown in and/or described in connection with at least one of the figures, as set forth more completely in the claims.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Ethernet has become an increasingly pervasive technology that has been applied in various contexts such as twisted pair and backplane. IEEE 802.3az Energy Efficient Ethernet (EEE) continues to evaluate various methods for reducing energy used by reducing link speeds during periods of low link utilization. In this process, a protocol would be defined that would facilitate transition to and from lower power consumption modes in response to changes in network demand.

As noted, one of the protocols being considered is low power idle (LPI). In general, LPI relies on turning the active channel silent and transmitting data at the highest rate, effectively duty-cycling the rate at its bandwidth capability and saving energy when the link is off. One implementation of LPI is described in non-provisional patent application Ser. No. 11/859,385, filed Sep. 21, 2007, entitled "Method and System for Low Power Idle Signal Transmission in Ethernet Networks," which is incorporated herein by reference in its entirety.

Figure 1:
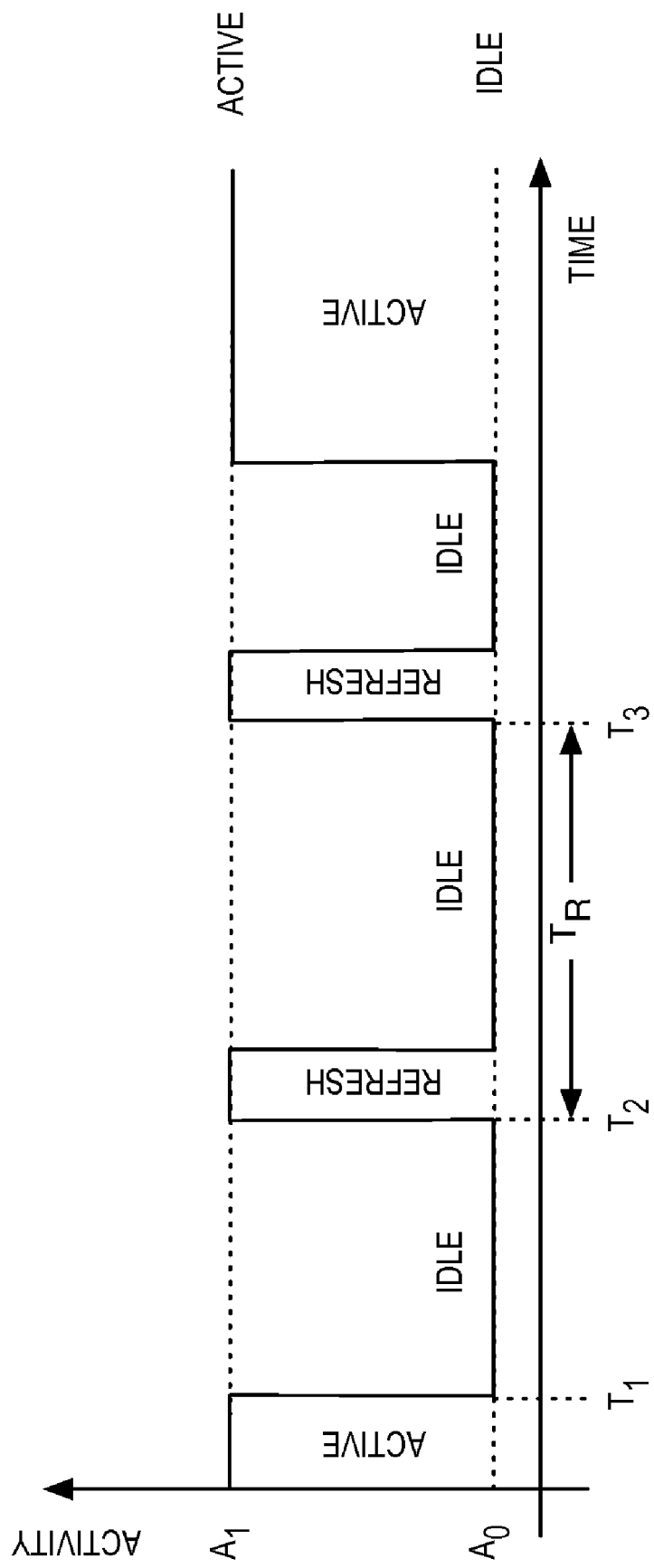
FIG. 1 illustrates an example of low power idle (LPI).

FIG. 1 illustrates an example of the operation of LPI on a link. In normal link operation, a link would operate at an active level $A_1$. Upon entering into a LPI mode at time $T_1$, the link would then operate at an idle level $A_0$. During these periods, the link is idle in terms of traffic but silent in terms of what is on the physical layer itself (e.g., MDI). As FIG. 1 further illustrates, refresh cycles would also be initiated periodically (e.g., times $T_2$ and $T_3$) when the link is in an LPI mode.

In general, the refresh cycle can be used to update necessary parameters on both ends of the link, such as settings for the cancellers (echo, NEXT, FEXT, etc.). In one example, the refresh cycle can be used for training/updates using an idle pattern. While the time of the refresh period can vary depending on the link rate, the period $T_R$ between refresh cycles (e.g., $T_3$-$T_2$) can be on the order of hundreds of milliseconds.

The delay between refresh cycles can lead to various deficiencies. First, the delay between the refresh cycles can lead to an inability or delay in detection of a cable unplug. The period between refresh cycles effectively creates "blind" windows. During these "blind" windows, transient problems (e.g., caused by poor cabling) would not be detected. If the problem persists beyond the "blind" window, then the problem would be detected late due to the delay between the refresh cycles. Here, the resolution in detection of a cable unplug condition would be directly tied to the delay in receiving the next refresh cycle. In some applications, the cable unplug detection latency as dictated by the refresh rate may not present a huge issue.

The cable unplug detection latency does present a significant issue, however, when dealing with hot-standby systems. One example of a hot standby system is a redundant link, where a detected failure on the active link would result in a quick transition to the hot redundant link. This switch to a hot-standby redundant link minimizes the impact of the loss of link on the data and the network. As a result, the latency imposed by the delay between refresh cycles may preclude the use of the EEE LPI mode in hot standby or other latency-sensitive network applications.

As would be appreciated, the latency imposed by the delay between refresh cycles can be reduced by increasing the refresh cycle period. Unfortunately, this proposed solution to the latency problem represents a tradeoff in that an increase in the refresh cycle rate also leads to a decline in the energy savings on the link. This results since the amount of time that the link resides in an idle state can be reduced to the point where the LPI technique becomes impractical for saving power. In other words, the LPI energy savings on the link would be too small to justify the increased complexity in the continual switching between active, idle, and refresh states.

Another deficiency caused by the delay between the refresh cycles is the potential for the loss of frequency lock between both sides of the link due to conditions such as drift. If the frequency lock is lost, then the bit error rate (BER) on the link would be driven higher when the PHY wakes up to transmit from LPI mode. As the BER may take a long time to stabilize, the effective transition time out of the LPI mode into an active mode would be too long. Conventionally, the way to circumvent this scenario is to have very frequent refreshes. These frequent refreshes would produce low energy savings, however, which can therefore lead to a conclusion that the implementation of LPI may not be a viable EEE solution.

It is therefore a feature of the present invention that the LPI mode can be accommodated by a mechanism that eliminates deficiencies such as those noted above. In one embodiment of the present invention, one or more link energy/sync pulses can be transmitted between refresh cycles to reduce the large latency that is imposed by the delay between refresh cycles.

Figure 2A:
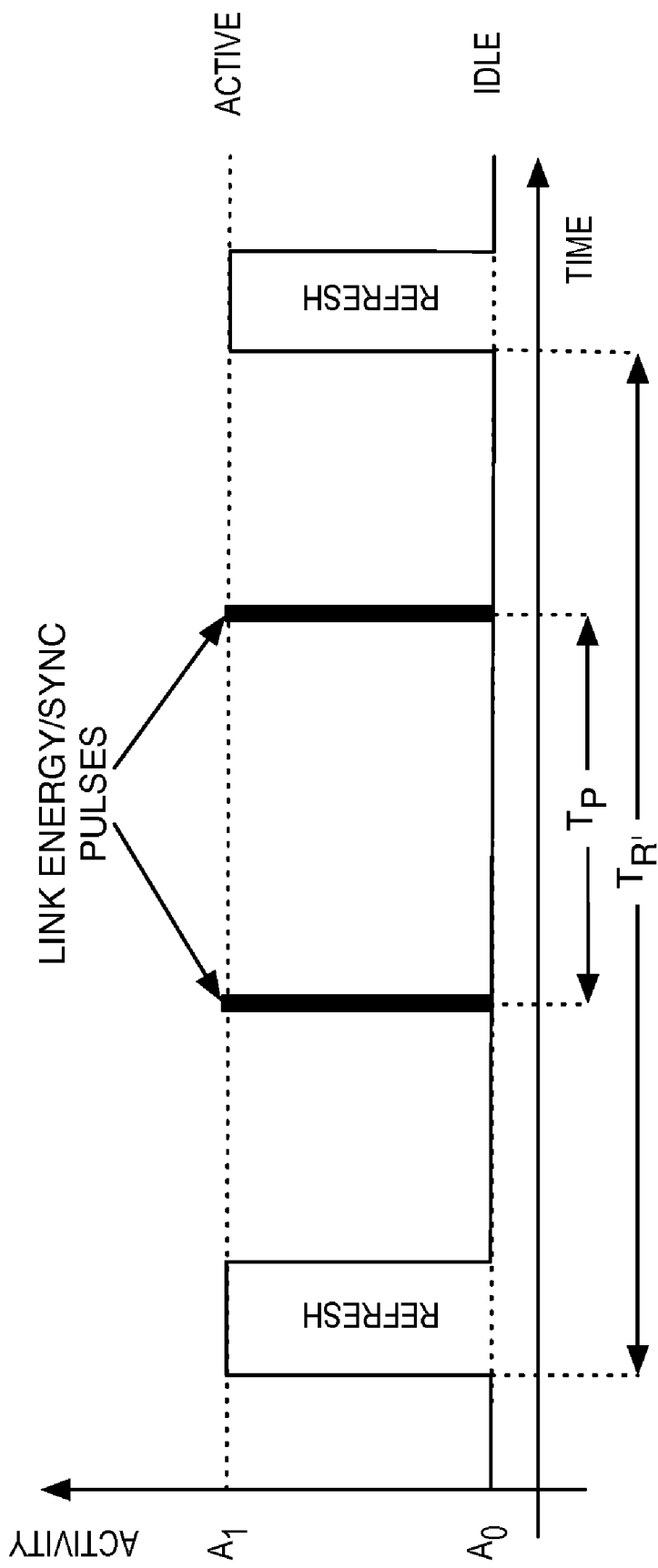
FIG. 2A illustrates an example of a link energy/sync pulse.

FIG. 2A illustrates an example of the inclusion of link energy/sync pulses between refresh cycles. As illustrated, the period $T_{R'}$ between two refresh cycles can be accompanied by link energy/sync pulses that can be separated by a period $T_P$. As would be appreciated, the number of link energy/sync pulses that are transmitted within a refresh cycle would be dependent on the reduction of latency that is desired. For example, a single link energy/sync pulse between the refresh cycles would reduce the latency period by one half, while two link energy/sync pulses between the refresh cycles would reduce the latency period by two thirds. In general, the transmission of link energy/sync pluses between the refresh signals serve to reduce the "blind" window where a disconnect determination cannot be made since there is no signal on the wire. As illustrated in FIG. 2, an advantage of using link energy/sync pulses is that the duration of the pulses is very short so the power impact is limited. This is in contrast to increasing the refresh signal frequency, which would have a more significant power impact.

In one embodiment, the link energy signal can be a repetitive tone that consumes little energy. This repetitive tone can be used to maintain frequency lock and would enable real-time detection of a cable unplug in EEE mode when LPI is used.

It is a feature of the present invention that the link energy/sync pulse does not require any complex circuitry. For example, the link energy/sync pulse would not require the low density parity check (LDPC) to be active nor would it be confused for a depleted frame (such as the refresh cycles). A further benefit of the link energy/sync pulse is that it can reduce the refresh cycle rate, which consumes more energy. In other words, the refresh cycle period $T_{R'}$, which is used with link energy/sync pulses, can be greater than the refresh cycle period $T_R$, which is used without link energy/sync pulses.

Figure 2B:
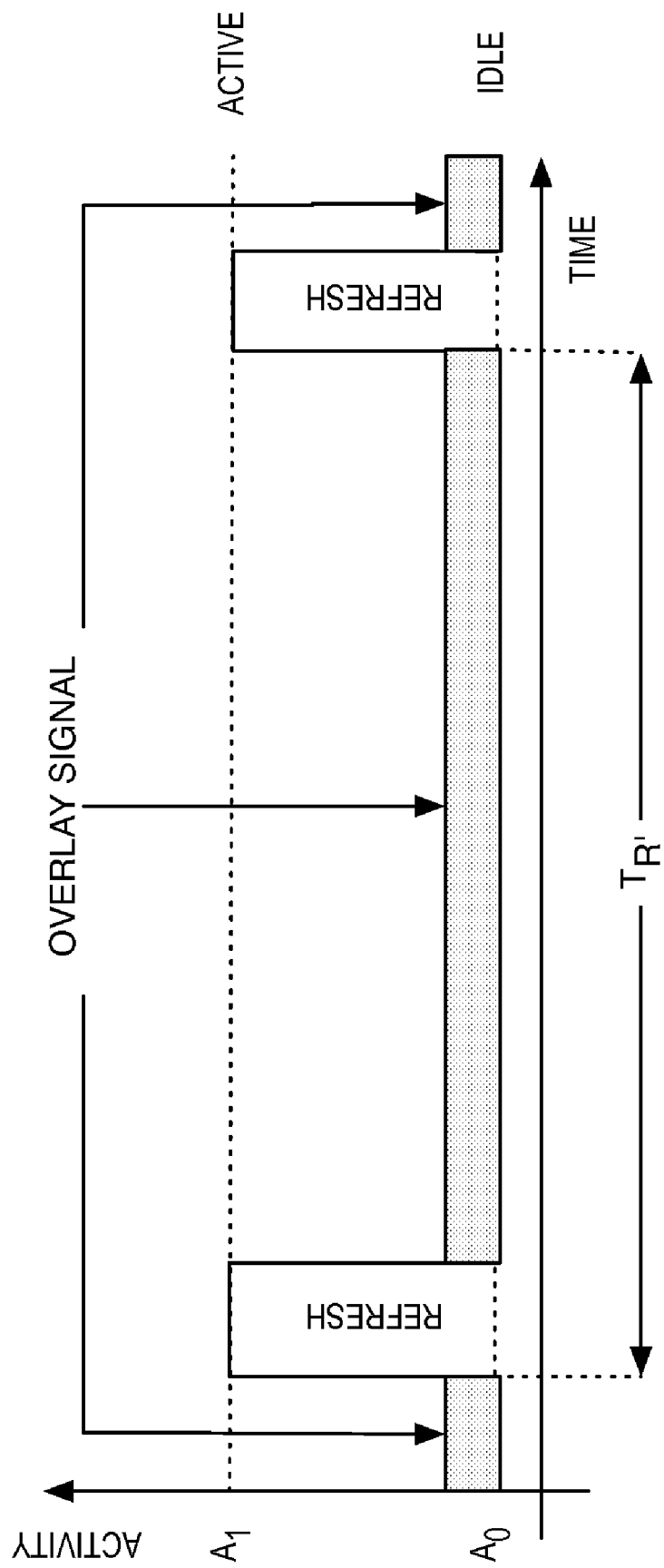
FIG. 2B illustrates an example of an overlay signal.

As would be appreciated, other signals can be used for a given link implementation. In one example applied to 10 GBASE-T, a 100 Mhz tone can be used to address the frequency drift issue. In another example, a simple PAM2 pseudorandom bit signal (PRBS) can be used on pair A during LPI mode. FIG. 2B illustrates an example of such a PRBS signal. As illustrated a very simple and low power PRBS signal can be overlaid onto the link when the link is in a silent mode (but not in an active mode). As illustrated, the PRBS signal could also (but need not) be disabled during the refresh cycle also. The use of the constant PRBS signal during the silent mode has various advantages. First, it completely eliminates any "blind" window where detection of a disconnect cannot occur. Second, the PRBS signal is very simple such that the circuitry associated with it on the PHY is simple. This enables the bulk of the circuitry to be turned off so the power consumed on the PHY is low. Third, the PRBS signal is a very small fraction of what a refresh or any other signal would be on the wire.

Figure 3:
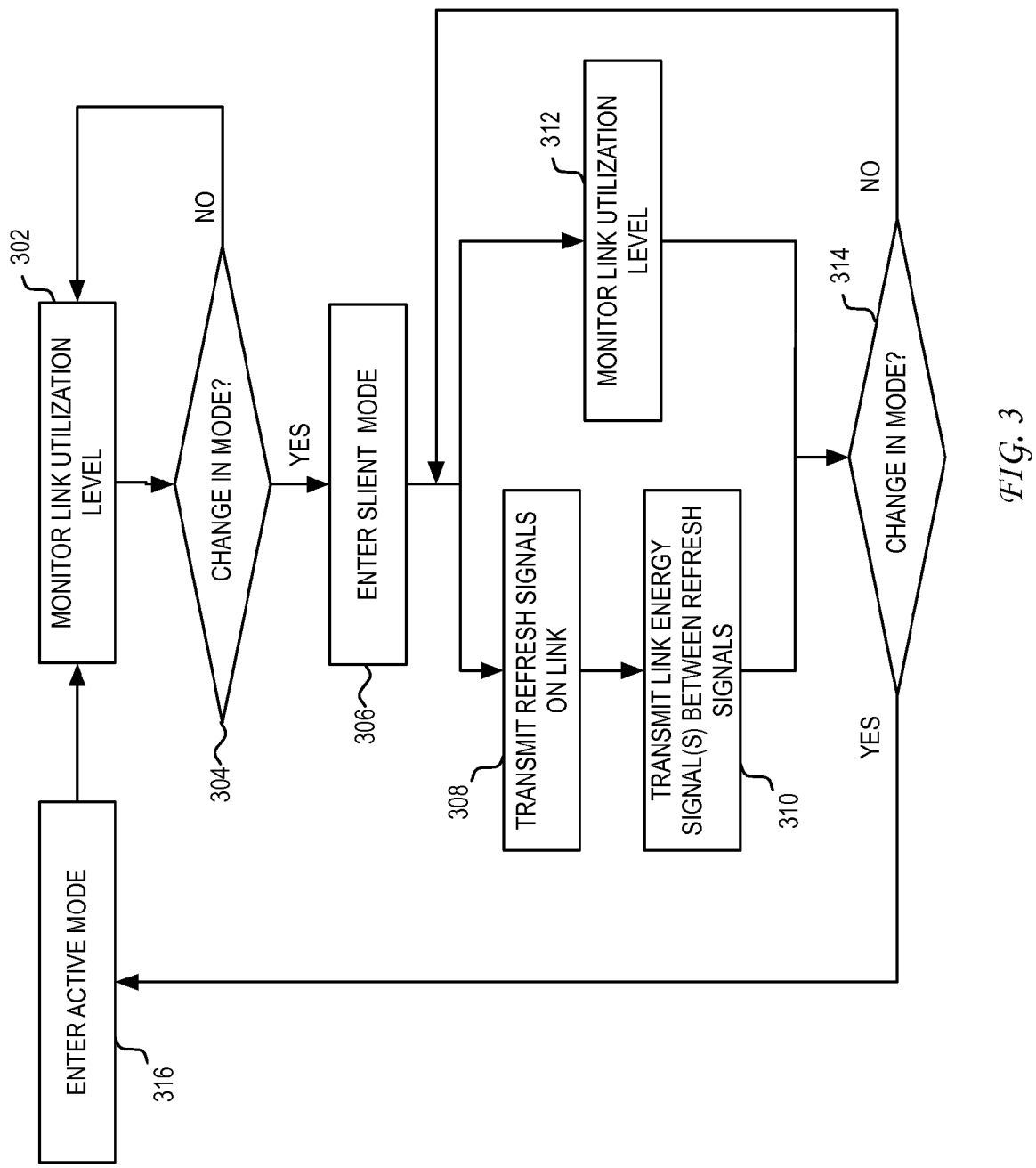
FIG. 3 illustrates a flowchart of a process of transitioning between different link utilization modes.

To further illustrate the principles of the present invention, reference is now made to the flowchart of FIG. 3. In this illustrated process, it is assumed that the link is initially operating in an active mode. The process begins at step 302, where a link utilization level is monitored. In one embodiment, the monitoring is based on an examination of traffic buffers. Monitoring of the link utilization level enables the system to determine whether or not the current link rate is properly matched with the amount of traffic to be transmitted. More specifically, if the link is idle, then a transition to a low link utilization mode (e.g., LPI mode) can be considered. At step 304, it is therefore determined whether the monitoring parameters indicate that a change in mode is needed.

If it is determined at step 304 that a change in mode is not needed, then the process continues back to step 302 where the link utilization levels continue to be monitored. If, on the other hand, it is determined at step 304 that a change in mode is needed, then the process continues to step 306 where a silent mode is entered. In one embodiment, the silent mode is an LPI mode.

While in the silent mode, the process continues to step 308 where refresh signals are transmitted on the link. As noted above, these refresh signals can be used to update necessary parameters on both ends of the link, such as settings for the cancellers (echo, NEXT, FEXT, etc.). Due to the delays between refresh cycles, the process of the present invention also transmits, at step 310, one or more link energy signals between refresh signals. It should be noted that the link energy signal can be designed to consume little energy. This is in contrast to the refresh signals, which require significant power in updating transceiver parameters.

As noted above, a pulse or overlay signal can be transmitted between refresh signals at step 310. Where a constant overlay signal is used, the processes of steps 308 and 310 can be combined.

As illustrated in the flowchart of FIG. 3, the link utilization level will continue to be monitored at step 312 while in the silent mode. This results since the arrival of traffic to be transmitted would trigger a return to the active mode. If it is determined at step 314 that a change in mode is not needed, then the process continues back to step 308 where refresh signals and link energy signals continue to be transmitted, and to step 312 where the link utilization levels continue to be monitored. If, on the other hand, it is determined at step 314 that a change in mode is needed, then the process continues to step 316 where an active mode is entered. The process then returns to step 302, where the link utilization level continues to be monitored.

Figure 4:
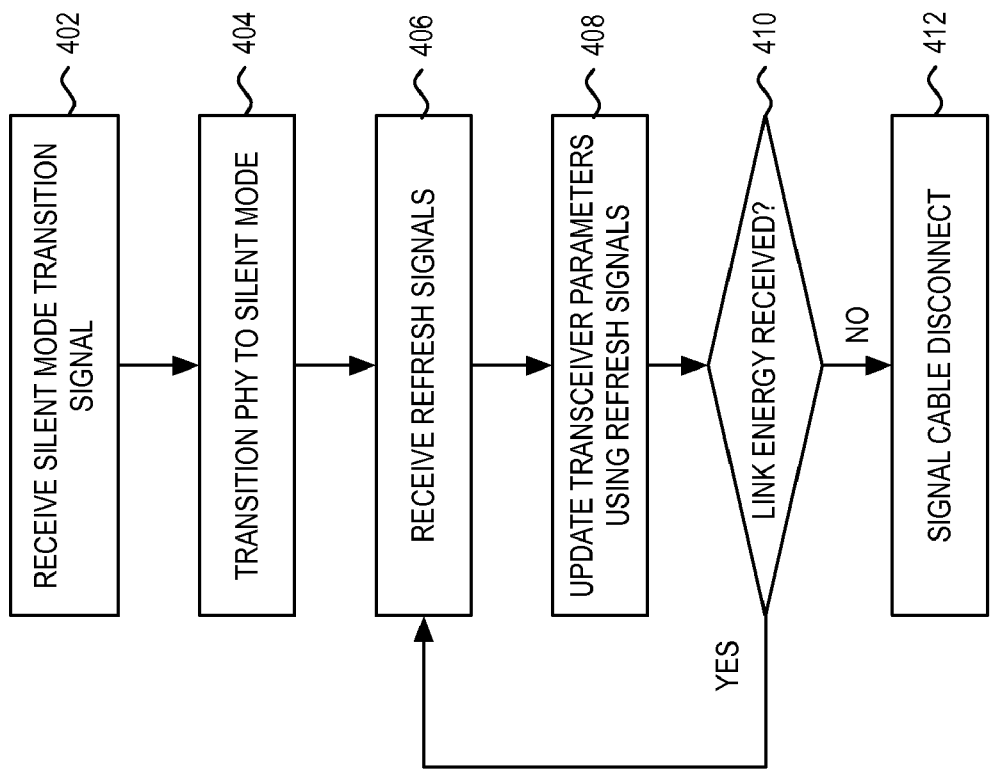
FIG. 4 illustrates a flowchart of a process of detecting a cable disconnect condition while in a low link utilization mode.

To illustrate the use of link energy signals in the detection of a cable unplug (or disconnect), reference is now made to the flowchart of FIG. 4. As illustrated, the process begins at step 402, where a low link utilization transition is signaled to the receiving system. As would be appreciated, a switch in link utilization mode would require coordination on both ends of the link. This coordination between both ends of the link can be facilitated in various ways (e.g., in band, out of band, etc.). In one embodiment, a request/acknowledge communication cycle is used. To facilitate a quicker transition, a physical layer control mechanism can be used. As would be appreciated, the principles of the present invention are not dependent on the particular communication mechanism that is implemented. After the low link utilization transition is signaled at step 402, the PHY in the receiving system can be transitioned to the low link utilization mode at step 404.

After transitioning to the low link utilization mode, the receiving system would then receive refresh signals at step 406. These refresh signals can be used to update the transceiver parameters at step 408. In eliminating the delay imposed by the period between refresh signals, the receiving system can also determine, at step 410, whether link energy have been received. This link energy can be representative of the link energy signals or refresh signals. If it is determined at step 410 that link energy has been received, then the receiving system knows that the transmitting system is still connected via the link. The process then continues back to step 406 where the receiving system continues to receive refresh signals. Although not shown in the process of FIG. 4, the process of receiving refresh signals and link energy signals will continue until the receiving system receives a high link utilization transition signal.

If, on the other hand, it is determined at step 410 that link energy has not been received, then the receiving system knows that a disruption has occurred in the link. The process would then continue to step 412, where the receiving system would signal a cable disconnect on the link. In various embodiments, this cable disconnect signaling can be used to trigger a failure recovery process, such as a switch to a redundant link.

In one application, the principles of the present invention can be used to detect and communicate a remote fault. This remote fault communication process would be initiated when a receive side of a link on the local partner detects a problem. In the case where the link is silent and there is no data, this detection could be due to a lack of energy on the link. Conventionally, communication of a remote or local fault currently requires that the PHY is taken out of the silent state and put back into the active state. This process adds latency and reduces power savings.

As the signaling of the fault or no-fault condition can be accomplished with a single bit, this fault information can be signaled through the encoding of the fault information into the refresh signals themselves. In one embodiment, the fault information can be included into the LDPC frame, or by transmitting a special refresh signal that carries this fault information. This enables the remote fault to be detected by the PHY.

As has been described, the transmission of link energy signals along with refresh signals while in a low link utilization mode can be used to detect a cable unplug (or disconnect) with low latency. This benefit is achieved without requiring a significant tradeoff in the power utilized in processing an increasing frequency of refresh signals.

In a conventional system, the lack of receipt of a refresh signal would force the system to restart the link. In one scenario, the refresh signal that is received may be incorrectly formatted. In one embodiment, the receipt of an incorrectly formatted refresh signal or the absence of a receipt of a refresh signal may not necessarily lead to an immediate restart of the link. Here, if a refresh signal is corrupted or missing, the link would not be automatically restarted. Rather, the system would wait for an error or absence of X number of refreshes (hardwired, programmed or calculated depending on how bad the errors are) before the link is restarted.

It should be noted that the principles of the present invention can be broadly applied to various contexts, such as in all PHYs that implement EEE (e.g., backplane, twisted pair, optical, etc.). Moreover, the principles of the present invention can be applied to standard or non-standard (e.g., 2.5 G, 5 G, etc.) link rates, as well as future link rates (e.g., 40 G, 100 G, etc.).

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A method, comprising:
    detecting a low link utilization condition on a link;
    transitioning a physical layer device from an active power mode to a low link utilization mode upon said detection;
    after said transition, transmitting a plurality of refresh signals on said link, said refresh signals enabling an update of transceiver parameters during said low link utilization mode; and
    between two of said plurality of refresh signals, transmitting a link energy signal on said link, said transmission of said link energy signal between two of said plurality of refresh signals enabling a second network device coupled to said link to reduce a delay in detecting a loss of said link, wherein said detection is based on a failure to receive a link energy signal in a time between two of said plurality of refresh signals.

2. The method of claim 1, wherein said transitioning comprises transitioning to a low power idle mode.

3. The method of claim 1, wherein said transmitting comprises transmitting on an inactive channel in a physical layer device interface.

4. The method of claim 1, wherein said transmitting comprises transmitting on an active channel in a physical layer device interface.

5. The method of claim 1, wherein said transmitting a link energy signal comprises transmitting a repetitive tone.

6. The method of claim 1, wherein said transmitting a link energy signal comprises transmitting a pulse signal between refresh signals.

7. The method of claim 1, wherein said transmitting a link energy signal comprises transmitting a pseudorandom bit signal.

8. The method of claim 1, wherein said link energy signal enables a reduction in frequency drift of a transceiver.

9. A method, comprising:
   receiving a low link utilization transition signal on a link;
   transitioning a physical layer device from an active power mode to a low link utilization mode based upon said received low link utilization transition signal;
   while in said low link utilization mode, receiving a plurality of refresh signals on said link, said plurality of refresh signals being received in intervals represented by a first time period;
   updating transceiver parameters in said physical layer device based on said received plurality of refresh signals;
   determining whether a link energy signal is received within a second time period after receipt of one of said received plurality of refresh signals, said second time period being less than said first time period; and
   signaling a loss of said link when it is determined that a link energy signal is not received within said second time period after receipt of one of said received plurality of refresh signals.

10. The method of claim 9, wherein said transitioning comprises transitioning to a low power idle mode.

11. The method of claim 9, wherein said receiving comprises receiving on an inactive channel in a physical layer device interface.

12. The method of claim 9, wherein said receiving comprises receiving on an active channel in a physical layer device interface.

13. The method of claim 9, wherein said link energy signal is a repetitive tone.

14. The method of claim 9, wherein said link energy signal is a pulse signal.

15. The method of claim 9, wherein said link energy signal is a pseudorandom bit signal.

16. The method of claim 9, further comprising synchronizing a frequency in a transceiver based on said received link energy signal.

17. The method of claim 9, further comprising transmitting a refresh signal that includes information reflective of said detected activity on said link.

18. The method of claim 17, wherein said transmitting a refresh signal comprises transmitting an low density parity check frame that includes information reflective of said detected activity on said link.

19. An energy efficient Ethernet method in a network device that enables a reduction in link failure detection time, comprising:
   after transitioning a physical layer device from an active power mode to a low power idle mode, receiving a plurality of refresh signals on a link, said plurality of refresh signals being received in intervals represented by a first time period;
   updating transceiver parameters in said physical layer device based on said received plurality of refresh signals;
   determining whether a link energy signal is received within a second time period after receipt of one of said received plurality of refresh signals, said second time period being less than said first time period; and
   signaling a loss of said link when it is determined that a link energy signal is not received within said second time period after receipt of one of said received plurality of refresh signals.

20. The method of claim 19, wherein said link energy signal is a repetitive tone.

21. The method of claim 19, wherein said link energy signal is a pulse signal.

22. The method of claim 19, wherein said link energy signal is a pseudorandom bit signal.

* * * * *